(12) United States Patent
Feldman et al.

(10) Patent No.: US 8,832,409 B2
(45) Date of Patent: Sep. 9, 2014

(54) DYNAMIC GUARDING OF A STORAGE MEDIA

(75) Inventors: Timothy Richard Feldman, Louisville, CO (US); Jonathan Williams Haines, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 310 days.

(21) Appl. No.: 13/044,247

(22) Filed: Mar. 9, 2011

(65) Prior Publication Data

US 2012/0233432 A1  Sep. 13, 2012

(51) Int. Cl.
*G06F 12/00* (2006.01)
*G11B 5/55* (2006.01)
*G11B 5/012* (2006.01)
*G11B 20/12* (2006.01)

(52) U.S. Cl.
CPC ........ *G11B 5/012* (2013.01); *G11B 2220/2516* (2013.01); *G11B 2020/1242* (2013.01); *G11B 5/5526* (2013.01); *G11B 2020/1277* (2013.01); *G11B 20/1258* (2013.01)
USPC ........................................................ 711/173

(58) Field of Classification Search
None
See application file for complete search history.

(56) References Cited

U.S. PATENT DOCUMENTS

| | | | |
|---|---|---|---|
| 7,688,544 B1 | 3/2010 | Mallary et al. | |
| 7,729,092 B1 | 6/2010 | Mallary et al. | |
| 7,827,378 B2 * | 11/2010 | Feldman et al. | ............... 711/202 |
| 2006/0227449 A1 | 10/2006 | Che et al. | |
| 2007/0030588 A1 | 2/2007 | Tsuchinaga et al. | |
| 2010/0232057 A1 | 9/2010 | Sanvido et al. | |
| 2011/0304935 A1 | 12/2011 | Chang et al. | |
| 2012/0210092 A1 * | 8/2012 | Feldman | ....................... 711/171 |

FOREIGN PATENT DOCUMENTS

| | | |
|---|---|---|
| EP | 1521261 A2 | 6/2005 |
| EP | 2498254 A2 | 9/2012 |
| WO | 0227723 A1 | 4/2002 |

OTHER PUBLICATIONS

Ahmed Amer et al., "Design Issues for a Shingled Write Disk System," 978-1-4244-7153-9/10 IEEE, May 10, 2010, 12 pages, Appeared in 26th IEEE Symposium on Massive Storage Systems and Technologies: Research Track (MSST 2010).
European Search Report for EP 12158808; May 16, 2013; 8 pages.

* cited by examiner

*Primary Examiner* — Brian Peugh
(74) *Attorney, Agent, or Firm* — HolzerIPLaw, PC

(57) ABSTRACT

A fixed data region on a storage medium may be allocated with one of a variety of allocation schemes (e.g., a randomly writable allocation scheme, a non-randomly writeable allocation scheme with a first data isolator spacing, a non-randomly writeable allocation scheme with a second data isolator spacing, and a non-randomly writeable allocation scheme with no dynamic isolators). Dynamic sub-region spacing refers at least to the number of data tracks in a data region of a magnetic disc between dynamic isolators and the number of bits in a data region in flash memory between dynamic isolators. The presently disclosed technology adapts isolators on the storage medium to create dynamic sub-regions based on characteristics of the storage medium, characteristics of the data, and/or expected access patterns of data to be written to the storage medium.

21 Claims, 4 Drawing Sheets

DYNAMIC GUARDING OF A STORAGE MEDIA

SUMMARY

Implementations described and claimed herein address the foregoing problems by providing a method comprising writing data into an available data region on a storage medium with an isolator allocation scheme selected based on one or more characteristics of the storage medium.

Other implementations are also described and recited herein.

BRIEF DESCRIPTIONS OF THE DRAWINGS

DETAILED DESCRIPTIONS

Figure 1:
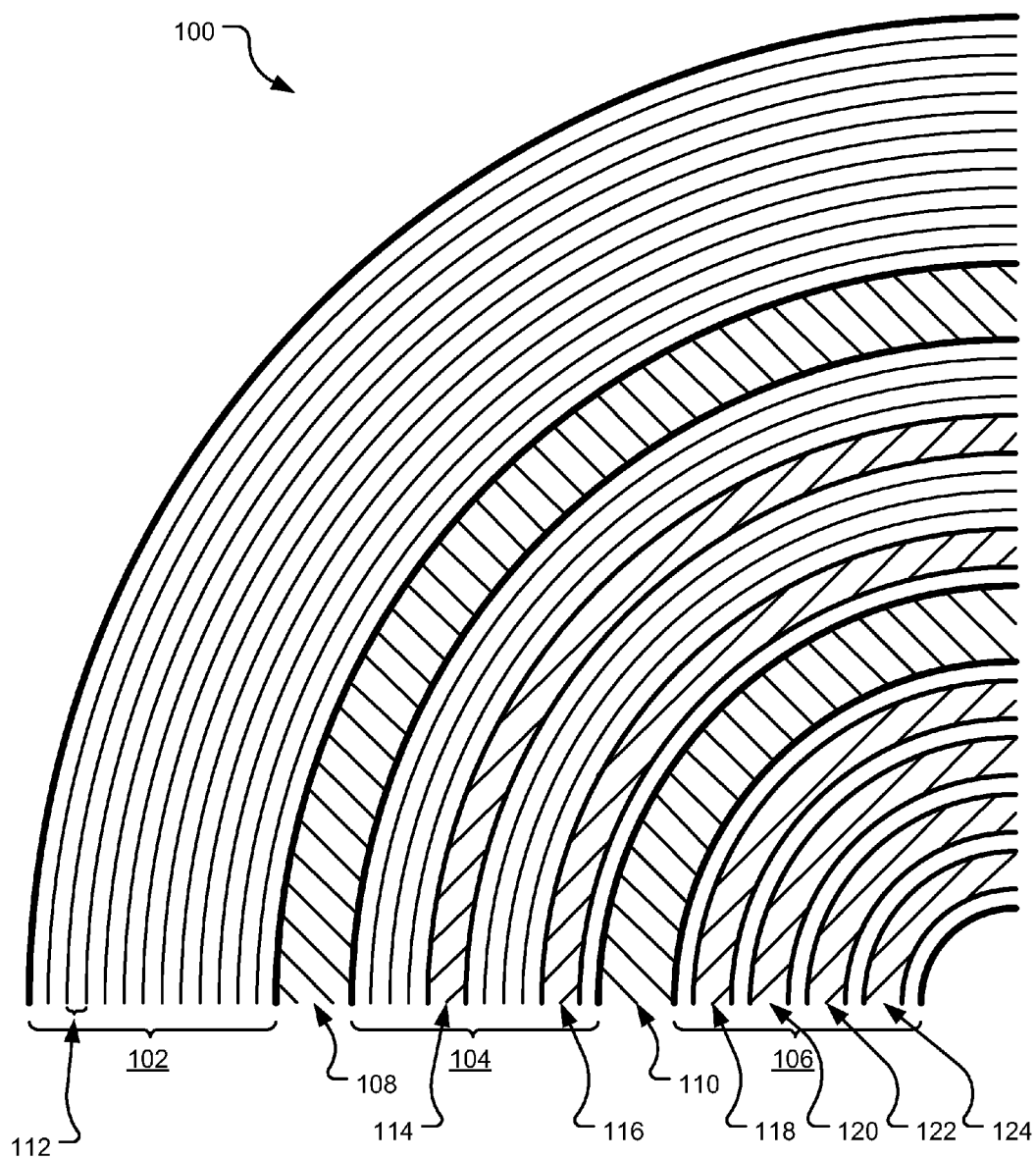
FIG. 1 illustrates a quarter section of an example magnetic disc with three data regions with dynamic sub-regions containing one or more adjacent data tracks.

Magnetic media storage drives store data in polarized cells on one or more magnetized media within each storage drive. A magnetic disc drive is one implementation of a magnetic media storage drive in which the magnetic medium is a disc and the polarized cells are arranged on the disc in concentric, generally circular tracks. In operation, one or more of the discs rotate at a constant high speed within the storage drive while information is written to and read from the tracks on the disc(s) using an actuator assembly. The actuator assembly rotates during a seek operation about a bearing shaft assembly positioned adjacent to the discs.

The actuator assembly includes one or more plurality of actuator arms that extend towards the discs. Mounted at the distal end of each of the actuator arms is a head with a read pole and a write pole. The write pole generates a magnetic field adapted to change the magnetic polarization of the cells on a corresponding disc (i.e., it writes data to the disc) and the read pole detects the magnetic polarization of the cells on the corresponding disc (i.e., it reads data from the disc).

In a conventionally recorded magnetic medium, each of the cells on the magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for the magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of an adjacent cells (i.e., overwrite the adjacent cells). One technique for adapting the magnetic media to utilize smaller cells while preventing adjacent cells from being overwritten during a write operation is shingled magnetic recording.

Shingled magnetic recording utilizes a large, strong write field generated by the write pole. A conventional constraint for shingled magnetic recording is that when the data is written to the magnetic media, it is written in sequentially increasing or decreasing radius tracks. The strong write field overlaps a currently written track with a previously written track, leaving only a relatively small strip of the previous write track unaffected, and also overlaps that currently written track with one or more not-yet-written tracks. The remaining strip of written data on the previously written track contains the aforementioned cells which, while merely a fraction of the feasible write size, are sufficiently large to be read using the read pole. As a result, while shingled magnetic recording still allows for traditional random access read operations, writes can no longer be done randomly because a single track write renders data previously stored on the one or more not-yet-written tracks unrecoverable. As a result, in order to change any data cell within the shingled data, typically the entire shingled data is re-written in a selected sequential write order.

In order to achieve the increased cell density made possible by shingled magnetic recording while compensating for the lack of random write functionality in a magnetic disc implementation, one or more guard tracks may be allocated on the disc with shingled data. The guard tracks are areas within the shingled data unavailable for recording that define separate bands of shingled data including multiple data tracks. Typically, each guard track is wide enough to prevent any overwriting across the guard track. As a result, the guard tracks create bands of shingled data that are isolated from other bands of shingled data. Only one band of shingled data is rewritten when one or more cells within the band are changed. More tightly spaced guard tracks create smaller bands between the guard tracks and thus the time to re-write a band decreases. However, as more guard tracks are used, the effective disc data storage density decreases because otherwise available space on the magnetic medium is occupied by the guard tracks. The presently disclosed technology dynamically adjusts the guard track spacing (which may be regular or irregular spacing) to maximize the benefits of shingled magnetic recording while minimizing decreased data storage density on the disc, as discussed in further detail below.

Flash memory, such as that used in memory cards, USB flash drives, and solid state drives, typically utilizes a storage scheme similar to shingled magnetic recording. Flash memory is a non-volatile computer storage technology that can be electrically erased and reprogrammed. It is a specific type of electrically-erasable programmable read-only memory (EEPROM) that is typically erased in large fixed erasure blocks separated by partitions. Flash memory stores information in an array of memory cells made from floating-gate transistors. In traditional single-level cell (SLC) devices, each cell stores only one bit of information. Multi-level cell (MLC) devices can store more than one bit per cell by choosing between multiple levels of electrical charge to apply to the floating gates of its cells. According to the presently disclosed technology, the number of storage bits per cell may be adjusted using dynamic partitions within each cell, for example by adjusting the spacing between cells in use per page within each erasure block of flash memory, and/or adjusting the spacing between pages in use within each erasure block. In one implementation, the dynamic partitions disclosed herein may define the spacing or guarding within each cell.

One limitation of flash memory is that although it can be read a page at a time in a random access fashion and programmed a page at a time in a sequential sequence, it is erased a block at a time. Erasure generally sets all bits in the block to 1. Starting with a freshly erased block, the pages within that block can be sequentially programmed. However, once a bit has been set to 0, only by erasing the entire block can it be changed back to 1. In other words, flash memory offers random-access read and sequential-access programming operations, but generally cannot offer random-access programming operations. This limitation is similar to the aforementioned limitation caused by shingled magnetic recording.

As a result, flash memory is well adapted to take advantage of the presently disclosed dynamic partitions. Where spacing on a magnetic medium effects the behavior of the allowed re-write behaviors, spacing for flash memory can affect the inter-cell interference and thus the reliability of the flash media. In flash memory, the flash block is erased before its pages are re-written. The dynamic spacing on a flash memory storage medium create erasure blocks with customized capacity and quality of service based on the data type and/or expected quality of service, including access patterns, of a data to be written to the flash memory storage medium as discussed with regard to FIG. 1. Data region logic (discussed in detail below with regard to FIGS. 4 and 5) determines optimum erasure block characteristics for a variety of data types and expected access patterns.

The presently disclosed technology dynamically adjusts isolator spacing (e.g., spacing between guard tracks in a magnetic disc implementation and/or spacing between partitions in a flash memory implementation) on a storage medium to create predefined fixed data regions or -regions (e.g., bands of a plurality of data tracks in a magnetic disc implementation and/or erasure blocks with a particular usage policy in a flash memory implementation) on the storage medium. The location of the dynamic isolators is based on the state of the storage device, the data type, and/or expected access patterns of a data to be written to the storage medium, for example. Data region logic (discussed in detail below with regard to FIG. 4) determines optimum band sizes and/or isolator locations for a variety of storage device states, data types, and expected access patterns. The presently disclosed technology applies at least to magnetic discs with fixed radius tracks, spirally recorded magnetic discs, and flash memory.

FIG. 1 illustrates a quarter section of an example magnetic disc 100 with three fixed data regions 102, 104, 106 with data sub-regions (also referred to as sub-bands) containing one or more adjacent data tracks (e.g., data track 112). Each of the data regions 102, 104, 106 contains a plurality of the data tracks. Shingled media is often formatted with regularly spaced isolators (e.g., fixed isolators 108 & 110) separating one or more predefined fixed data regions (e.g., fixed data regions 102, 104, 106) from one another. In some implementations, the predefined fixed data regions are naturally isolated from one another (e.g., each writable surface on one or more discs in a disc drive and each flash die in a flash drive). Fixed isolator 108 separates fixed data regions 102 and 104 from one another. Fixed isolator 110 separates fixed data regions 104 and 106 from one another. In some implementations, all the isolators are dynamically adjustable and thus the data regions are dynamically allocated. In other implementations, no fixed isolators are present and thus there is a single data region on the disc 100.

The presently disclosed technology creates dynamic isolators (e.g., dynamic isolators 114, 116, 118, 120, 122, & 124) which define the dynamic sub-regions within each of the fixed data regions 102, 104, 106. In one implementation, the fixed isolators 108 and 110 may be significantly bigger than the dynamic isolators 114, 116, 118, 120, 122, & 124 because a fixed isolator must withstand re-writes for the life of the magnetic disc 100, while the dynamic isolators must only withstand re-writes until the dynamic isolators are moved. In other implementations, the fixed isolators 108 and 110 and dynamic isolators 114, 116, 118, 120, 122, and 124 are of a similar size. In other implementations, the fixed isolators 108 and 110 may be significantly smaller than the dynamic isolators 114, 116, 118, 120, 122, & 124 because a dynamic isolator must withstand high re-write rates of the interspersed data tracks, while the fixed isolators must only withstand the low re-write rate of the full region. The number, spacing and relative size of the fixed data regions 102, 104, 106, fixed isolators 108 & 110, data tracks, and/or dynamic isolators 114, 116, 118, 120, 122, & 124 is not drawn to scale and is used for illustrative purposes only.

In fixed data region 102, there are no dynamic isolators. As a result, fixed data region 102 encompasses 13 data tracks and no dynamic sub-regions. So long as fixed data region 102 has available empty space, data may be written to fixed data region 102 in sequentially increasing or decreasing radius tracks. However, once the fixed data region 102 is filled with data, and when one or more data cells within the fixed data region 102 needs to be modified, all of the data within fixed data region 102 is copied to another location to allow a subsequent write of the region.

In one implementation, data region logic (discussed in detail below with regard to FIGS. 4 and 5) determines that the optimal data sub-region size for the fixed data region 104 is four tracks. As a result, fixed data region 104 is subdivided into three sets of data tracks (i.e., data sub-regions), wherein each data sub-region is separated by 2-track dynamic isolators 114 and 116. Since the fixed data region 104 does not divide evenly into data sub-regions of four data tracks, one data sub-region includes only one data track. For example, the layout of fixed data region 104 may be used for data that likely to be accessed more frequently than data stored in fixed data region 102. The time to copy data from a 4-track data sub-region is significantly faster than copying the entire 13-track data region in fixed data region 102. The cost of the additional copy speed is a capacity reduction due to a total data track number reduction from 13 tracks in fixed data region 102 to nine tracks in fixed data region 104.

The data region logic (discussed in detail below with regard to FIG. 4) determines that the optimal data sub-region size for fixed data region 106 is one track. As a result, fixed data region 106 is subdivided into five data sub-regions (each of one track), wherein each data sub-region is separated by dynamic isolators 118, 120, 122, & 124. For example, the layout of fixed data region 106 may be used for data that likely to be accessed even more frequently than data stored in fixed data region 104. With a single track in each data sub-region, data may be written directly into fixed data region 106 instead of copying the data before writing the region. This is significantly faster than copying a data sub-region of four tracks in fixed data region 104, let alone the entire 13-track data region in fixed data region 102. The cost of the additional copy speed is a capacity reduction due to a total track number reduction from nine tracks in fixed data region 104 to five tracks in fixed data region 106.

Referring back to fixed data region 102, the lack of dynamic isolators may be conducive to data expected to be copied sequentially to the fixed data region 102 and/or not modified or rarely modified. Further, the data region logic may at some point determine that fixed data in fixed data region 102 should be divided into smaller sub-regions. Data may be copied out of the fixed data region 102 and put into smaller sub-regions. Then fixed data region 102 is allowed to be sub-divided as per the data region logic.

Each of the fixed data regions 102, 104, 106 may be re-subdivided repeatedly as the data region logic determines to be appropriate. Each new sub-region may be smaller or larger than a previous sub-region. When the layout of dynamic isolators in a target data region are to be changed, the existing data within a target data region, if any, is copied out of the target data region. The new dynamic isolator layout is applied to the target data region before any new data is written to the target data region.

In one implementation, allocation of dynamic isolators is referred to herein as decimation of the region. More specifically, a fully decimated region allocates dynamic isolators in a way that creates single-track sub-regions (see e.g., fixed data region 106). A partially decimated region allocates dynamic isolators, but not for single-track sub-regions (see e.g., fixed data region 104). A non-decimated magnetic medium does not allocate any dynamic isolators (see e.g., fixed data region 102).

Figure 2:
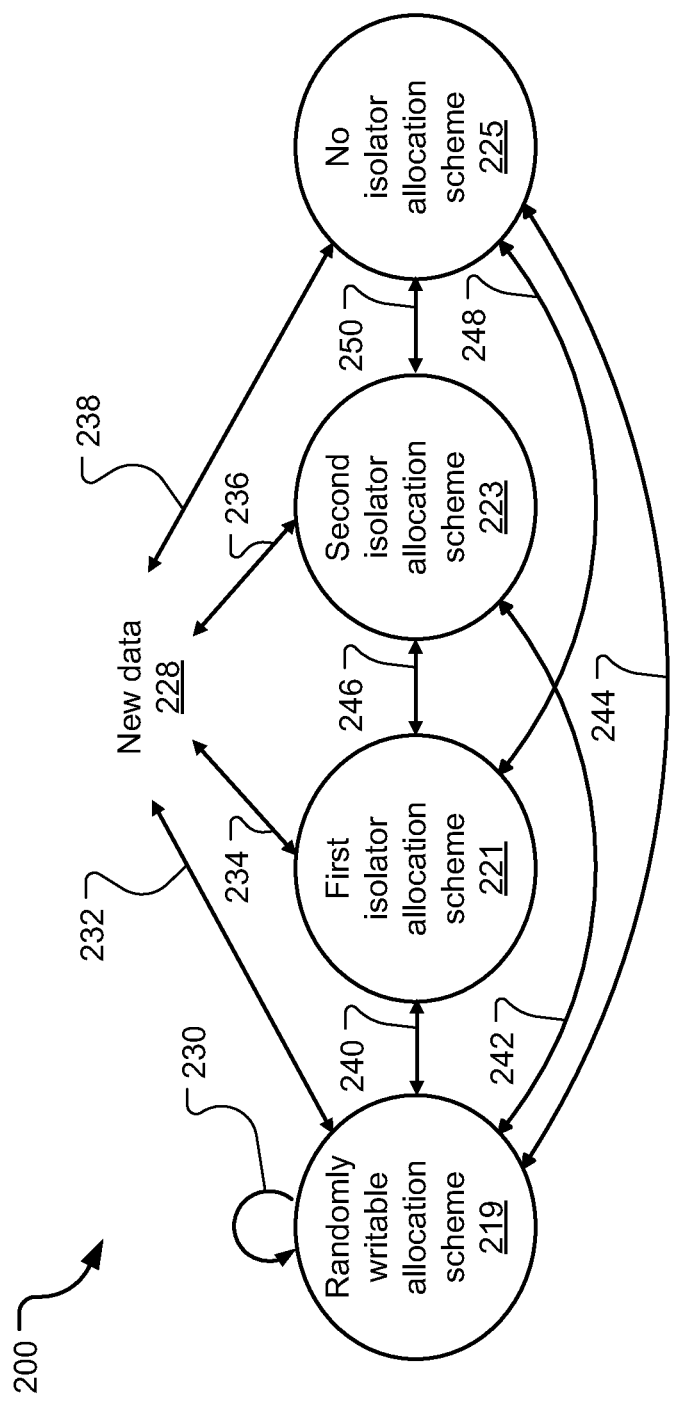
FIG. 2 illustrates a state diagram for allocating new data to and re-allocating existing data between regions with different isolator allocation schemes.

FIG. 2 illustrates an example state diagram 200 for writing new data 228 to and rewriting existing data between regions with different isolator allocation schemes. A data region may be configured with one of a variety of isolator allocation schemes. For example, the allocation schemes may include a randomly writable or fully decimated isolator allocation scheme 219, a non-randomly writeable or partially decimated (e.g., shingled) scheme with a first dynamic isolator spacing 221 (hereinafter, the first dynamic isolator allocation scheme 221), a non-randomly writeable or partially decimated (e.g., shingled) scheme with a second dynamic isolator spacing 223 (hereinafter, the second dynamic isolator allocation scheme 223), and a non-randomly writeable or non-decimated scheme with no fixed or dynamic isolators 225 (hereinafter, the no isolator allocation scheme 225). Data sub-region spacing at least refers to the number of data tracks in a data region of a magnetic disc between dynamic isolators and the number of bits in a data region in flash memory between dynamic isolators. These four isolator allocation schemes are examples only as many other schemes may exist, including many different data sub-region spacing schemes.

The new data 228 (incoming from a host, for example) is written to a data region with sufficient available space (i.e., an available data region) to store the new data 228. If new data 228 is particularly large or the available space in the data regions is particularly small, the new data 228 may be stored in multiple data regions. Data region logic (discussed in detail below with regard to FIG. 4) determines an ideal isolator allocation scheme for the particular type and/or size of data that new data 228 contains. In one implementation, a default scheme is chosen for all new data. In another implementation, the data region logic analyzes features of the new data 228 (e.g., file size, file type, and/or source of the new data) to select an allocation scheme.

As illustrated by arrows 232, 234, 236, 238, the new data 228 may be copied to any available data region that has the randomly writable isolator allocation scheme 219, the first dynamic isolator allocation scheme 221, the second dynamic isolator allocation scheme 223, or the no isolator allocation scheme 225 that has sufficient space to store the new data 228 and that satisfies any requirements imposed by the data region logic. If there is an empty data region, the empty data region may be configured to have the selected allocation scheme. Further, if there is not an empty available data region or an available data region with the selected allocation scheme and sufficient space to store the new data 228, the new data 228 may be stored in the available data region(s) with another allocation scheme.

For example, the data region logic determines that the new data 228 should be stored in a data region with the first dynamic isolator allocation scheme 221 and there are insufficient available data regions with the first dynamic isolator allocation scheme 221 to store the new data 228. If there are one or more empty data regions, an empty data region may be configured to the first dynamic isolator allocation scheme 221. The new data 228 may then be stored in the configured data region. If there are no empty data regions, all or part of new data 228 may be copied to one or more available data regions with another allocation scheme (e.g., the randomly writable scheme 219 or the second dynamic isolator allocation scheme 223).

Existing data within a data region may be modified and/or copied to another data region or data sub-region within a data region. When existing data is copied, it may move from a data region with one scheme to another data region with the same or a different scheme or back to the same data region that may have been re-configured. This may occur when the data region logic selects an allocation scheme for the existing data is different that the scheme where the existing data is stored. For example, the data region logic may look at data size, data type, data age, historical read patterns (e.g., sequential or non-sequential) of the data, historical write patterns (e.g., sequential or non-sequential) of the data, fragmentation of the data, etc. to determine if the selected allocation scheme for the data has changed or is different than the scheme for the region where the data is currently stored. Further, the data region logic may consider features of the storage medium, such as capacity, percent of total capacity filled, read/write rate, access time, reliability, retention capability, and inter-symbol interference, in selecting an allocation scheme. If there is sufficient available space in a data region with the selected allocation scheme, the data may be moved directly to that data region.

For example, existing data stored in a data region having the randomly writable allocation scheme 219 may be moved to another data region having the first dynamic isolator allocation scheme 221, the second dynamic isolator allocation scheme 223, or the no isolator scheme 225 as illustrated by arrows 240, 242, 244, respectively. Further, existing data stored in a data region having the first dynamic isolator allocation scheme 221 may be moved to another data region having the randomly writable scheme 219, the second dynamic isolator allocation scheme 223, or the no isolator scheme 225 as illustrated by arrows 240, 246, 248, respectively. Still further, existing data stored in a data region having the second dynamic isolator allocation scheme 223 may be moved to another data region having the randomly writable scheme 219, the first dynamic isolator allocation scheme 221, or the no isolator scheme 225 as illustrated by arrows 242, 246, 250, respectively. Further yet, existing data stored in a data region having the no dynamic isolator scheme 225 may be moved to another data region having the randomly writable scheme 219, the first dynamic isolator allocation scheme 221, or the second dynamic isolator allocation scheme 223 as illustrated by arrows 244, 248, 250, respectively. When existing data within a data region having the randomly writable allocation scheme 219 is modified, the modified portions may be written into the existing data in place, as illustrated by arrow 230.

Figure 3:
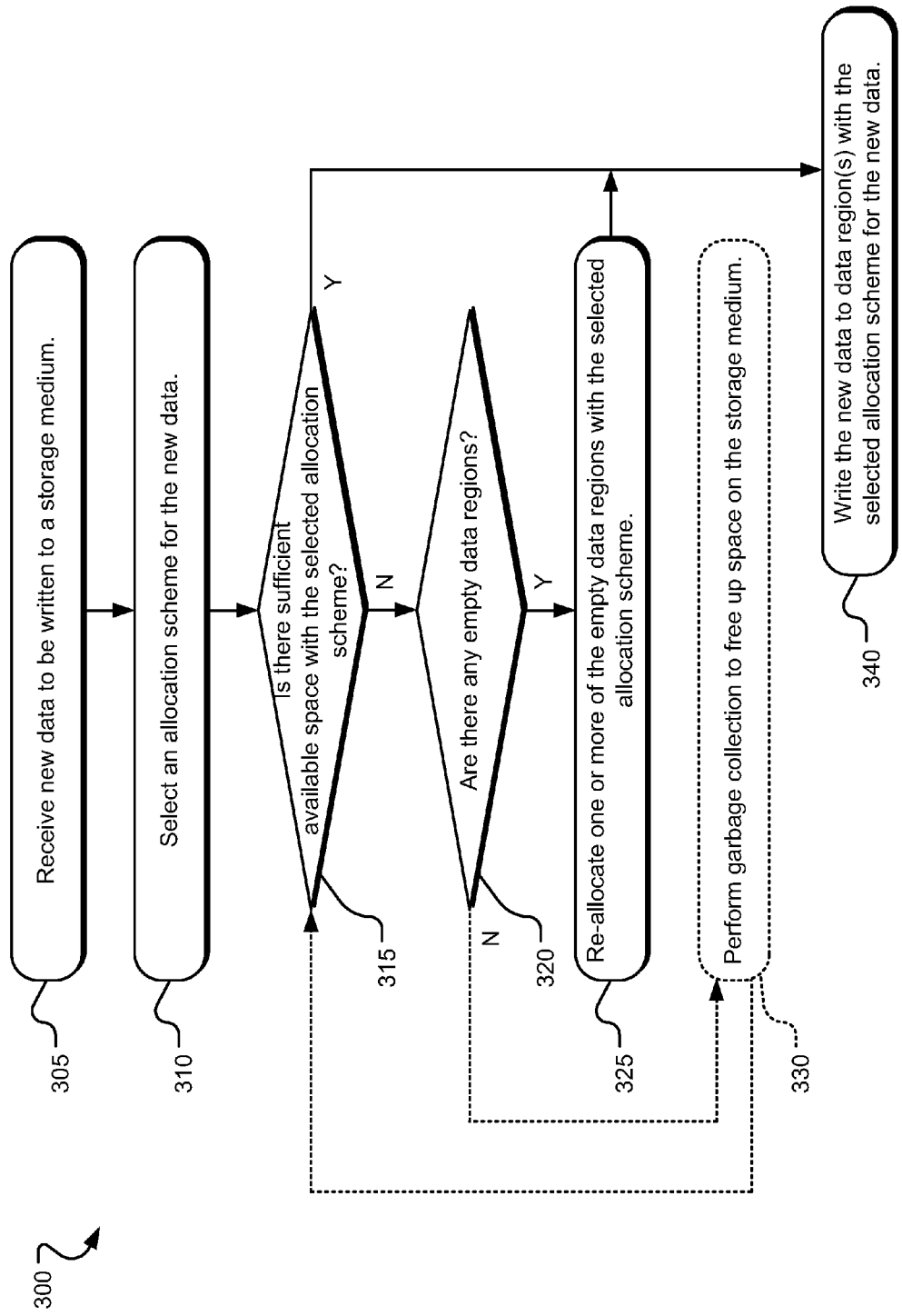
FIG. 3 illustrates example operations for writing new data to a selected data region on a storage medium.

FIG. 3 illustrates example operations 300 for writing new data to a region on a storage medium. In receiving operation 305, a memory buffer receives new data to write to the storage medium. The new data may be virtually any size and type that is capable of being written to the storage medium. In a selecting operation 310, data region logic determines and selects an allocation scheme for the new data. In one implementation, a storage device has a discrete number of available allocation schemes that may be applied to the storage medium. One or more of the available allocation schemes may have a consistent number of data tracks between dynamic partitions within the allocation scheme. Further, the storage medium may record data on the storage medium with two or more of the allocation schemes. Multiple allocation schemes may exist concurrently on the storage medium. For example, the data region logic may look at data size, data type, data age, historical read patterns (e.g., sequential or non-sequential) of the data, historical write patterns (e.g., sequential or non-sequential) of the data, fragmentation of the data, etc. to determine and select the allocation scheme for the data. In other implementations, all new data is written to a default scheme. The schemes may include, randomly writable, non-randomly writable with a first isolator spacing, non-randomly writable with a second isolator spacing, or non-randomly writable with no isolators, for example.

Query operation 315 determines if there is sufficient available space with the selected allocation scheme to write the new data to the storage medium. Control firmware may keep tables of scheme configuration information for each data region and the amount of storage space, if any, available in each data region. If sufficient space is available, in writing operation 340, the new data is written to data region(s) with the selected allocation scheme for the new data. If there is insufficient available space in the allocation scheme to write the new data to the storage medium, query operation 320 determines if there are any empty data regions on the storage medium, regardless of scheme. If so, in re-configuration operation 325, one or more of the empty data regions are re-configured with the selected allocation scheme for the new data. Then, in writing operation 340, the new data is written to the re-configured data region(s).

In optional performing operation 330, garbage collection frees up useable space on the storage medium. Garbage collection (GC) is a form of memory management. The garbage collector, or just collector, attempts to reclaim garbage, or memory occupied by objects that are no longer in use. Further, the collector may consolidate and/or re-organize memory occupied by objects that are in use to free up useable space. The collector may free up sufficient space to change the outcome of query operation 315 and/or query operation 320. As a result, operations 315, 320, and 330 may repeat until operations 325 or 340 become available. In some implementations, garbage collection is not used.

Figure 4:
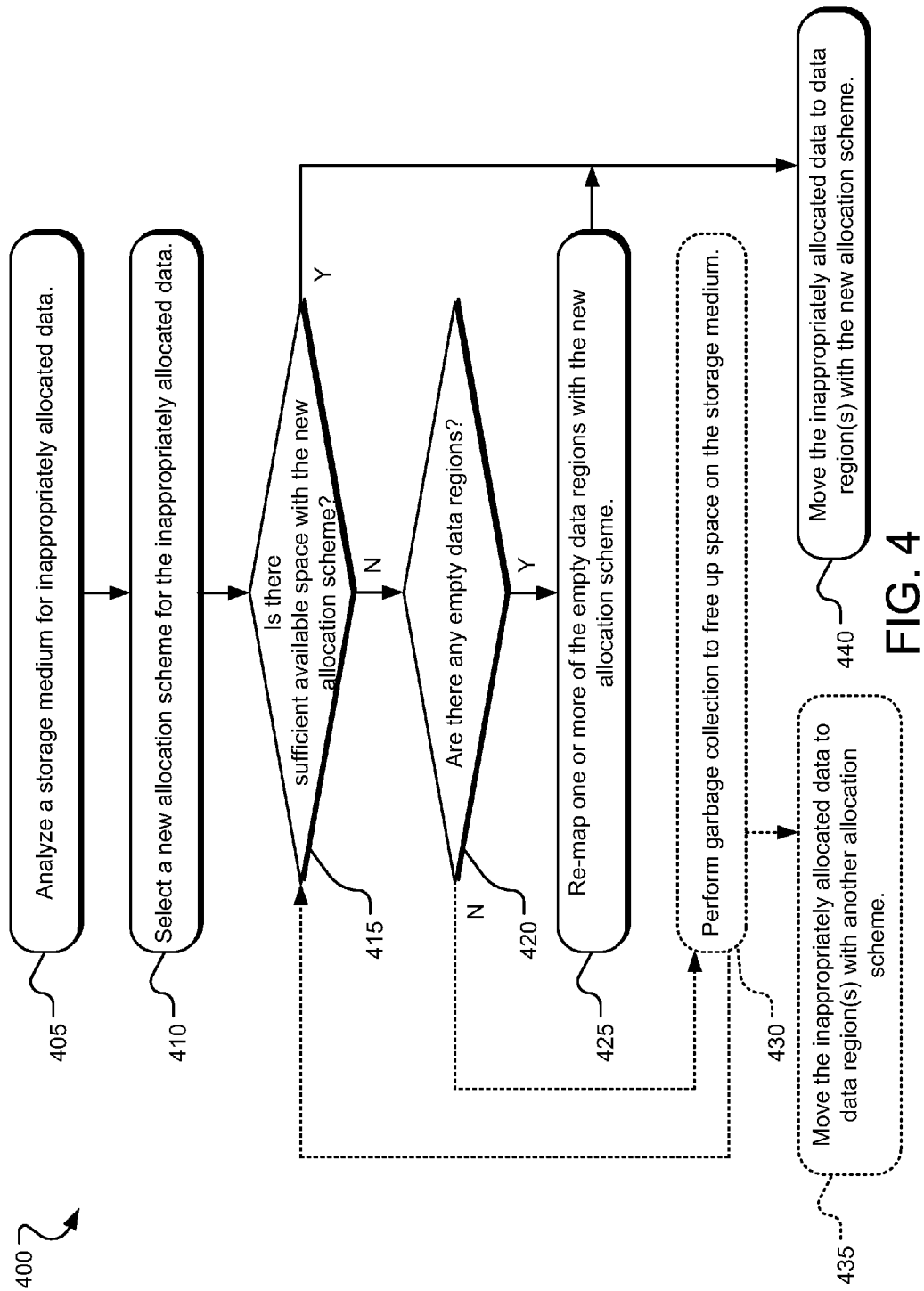
FIG. 4 illustrates example operations for moving existing data on a storage medium to another data region on the storage medium.

FIG. 4 illustrates example operations 400 for moving existing data on a storage medium to another data region on the storage medium. In an analyzing operation 405, a storage medium is analyzed for inappropriately allocated data. When initially copied to the storage medium, data region logic determines and selects an allocation scheme for the new data. However, factors controlling selection of the allocation scheme may change over time. Thus, the data is or becomes inappropriately allocated. For example, data age, read patterns (e.g., sequential or non-sequential) of the data, write patterns (e.g., sequential or non-sequential) of the data, fragmentation of the data, etc. may change. In a selecting operation 410, data region logic determines and selects a new allocation scheme for the inappropriately allocated data. In one implementation, a storage device has a discrete number of available allocation schemes that may be applied to the storage medium. One or more of the available allocation schemes may have a consistent number of data tracks between dynamic partitions within the allocation scheme. Further, the storage medium may record data on the storage medium with two or more of the allocation schemes. Multiple allocation schemes may exist concurrently on the storage medium. The allocation schemes may include, randomly writable, non-randomly writable with a first isolator spacing, non-randomly writable with a second isolator spacing, or non-randomly writable with no isolators, for example.

Query operation 415 determines if there is sufficient available space with the new allocation scheme to move the inappropriately allocated data to the new allocation scheme. If sufficient space is available, in moving operation 440, the inappropriately allocated data is moved to data region(s) with the new allocation scheme. In there is insufficient available space with the new allocation scheme to move the inappropriately allocated data, query operation 420 determines if there are any empty data regions on the storage medium, regardless of allocation scheme. If so, in re-allocation operation 425, one or more of the empty data regions are re-allocated with the new allocation scheme for the inappropriately allocated data. Then, in writing operation 440, the inappropriately allocated data is moved to the re-allocated data region(s).

In optional performing operation 430, garbage collection frees up useable space on the storage medium. Garbage collection may free up sufficient space to change the outcome of query operation 415 and/or query operation 420. As a result, operations 415, 420, and 430 may repeat until operations 425 or 440 become available. In some implementations, the optional performing operation 430 is unable to free up sufficient space to change the outcome of query operation 415 and/or query operation 420.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:
1. A method comprising:
writing data into an available data region in a storage medium with an isolator allocation scheme selected from multiple isolator allocation schemes, wherein each of the multiple isolator allocation schemes provides different data region isolator spacing compared to the other of the multiple isolator allocation schemes, and wherein isolator spacing is at least one of a spacing between guard tracks and a spacing between partitions.
2. The method of claim 1, further comprising: selecting the isolator allocation scheme prior to the writing operation.

3. The method of claim 1, wherein the available data region with the selected isolator allocation scheme is randomly writable.

4. The method of claim 1, wherein the selected isolator allocation scheme has sub-regions, and wherein spacing between the sub-regions is based on the one or more characteristics of the storage medium.

5. The method of claim 4, wherein the sub-regions are separated by dynamic isolators.

6. The method of claim 5, wherein the data regions on the storage medium are separated by fixed isolators.

7. The method of claim 1, wherein the storage medium includes one or more data regions.

8. The method of claim 1, further comprising: moving the data into an available data region with a different isolator allocation scheme selected from the multiple isolator allocation schemes.

9. The method of claim 1, wherein the isolator allocation scheme is selected based on one or more characteristics of the data.

10. The method of claim 9, wherein the characteristics of the data includes one or more of data size, data type, data age, historical read patterns of the data, historical write patterns of the data, and fragmentation of the data.

11. The method of claim 1, wherein the isolator allocation scheme is selected based on one or more characteristics of the storage medium.

12. The method of claim 11, wherein the characteristics of the storage medium includes one or more of capacity, percent of total capacity filled, read/write rate, access time, reliability, retention capability, and inter-symbol interference.

13. The method of claim 1, wherein the guard tracks are guard tracks on a shingled media and the partitions are partitions on a flash memory.

14. The method of claim 1, wherein writing data into an available data region in a storage medium is accomplished by dynamically adjusting the isolator spacing.

15. A device comprising:
circuitry configured to select an isolator allocation scheme from multiple isolator allocation schemes, wherein each of the multiple isolator allocation schemes provides different isolator spacing between data regions compared to the other of the multiple isolator allocation schemes, and wherein the isolator spacing is a spacing between guard tracks on a shingled media.

16. The device of claim 15, wherein the circuitry is further configured to write data to an available data region with the selected isolator allocation scheme.

17. The device of claim 15, wherein the selected isolator allocation scheme has dynamic sub-regions, and wherein spacing between the dynamic sub-regions is based on the one or more characteristics of the storage medium.

18. The device of claim 15, wherein the circuitry is further configured to move data into one of the data regions on the storage medium with a different isolator allocation scheme selected from the multiple isolator allocation schemes.

19. The device of claim 15, wherein the isolator allocation scheme is selected based on at least one or more characteristics of the storage medium and on one or more characteristics of the data.

20. The device of claim 15, wherein guard tracks separate bands of data wherein writing to one or more cells within a one of the separate bands requires rewriting only the one of the separate bands.

21. A storage device configured to record a first region of data having a first isolator allocation scheme and a second region of data having a second isolator allocation scheme, wherein the first and second allocation isolator schemes exist in the storage device concurrently, and wherein each of the first and the second isolator allocation schemes provides different data region isolator spacing, the isolator spacing being a spacing between partitions in a flash memory.

* * * * *